(12) United States Patent
Seo et al.

(10) Patent No.: US 11,088,563 B2
(45) Date of Patent: Aug. 10, 2021

(54) ELECTRONIC DEVICE AND METHOD FOR CONTROLLING WIRELESS CHARGING

(71) Applicant: Samsung Electronics Co., Ltd., Gyeonggi-do (KR)

(72) Inventors: Hyun-Deok Seo, Gyeonggi-do (KR); Ku-Chul Jung, Gyeonggi-do (KR); Sang-Hyun Ryu, Suwon-si (KR); Min-Jeong Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 16/334,827

(22) PCT Filed: Sep. 21, 2017

(86) PCT No.: PCT/KR2017/010404
§ 371 (c)(1),
(2) Date: Mar. 20, 2019

(87) PCT Pub. No.: WO2018/066847
PCT Pub. Date: Apr. 12, 2018

(65) Prior Publication Data
US 2020/0021126 A1    Jan. 16, 2020

(30) Foreign Application Priority Data
Oct. 6, 2016  (KR) .................. 10-2016-0128876

(51) Int. Cl.
*H02J 50/90* (2016.01)
*H02J 7/02* (2016.01)
(Continued)

(52) U.S. Cl.
CPC .............. *H02J 7/025* (2013.01); *H02J 50/10* (2016.02); *H02J 50/80* (2016.02); *H02J 50/90* (2016.02)

(58) Field of Classification Search
CPC ....................................................... H02J 7/025
(Continued)

(56) References Cited

U.S. PATENT DOCUMENTS

2012/0223590 A1    9/2012  Low et al.
2014/0159654 A1    6/2014  Lee et al.
(Continued)

FOREIGN PATENT DOCUMENTS

JP     2008-17562 A    1/2008
JP     2015-008605 A   1/2015
(Continued)

OTHER PUBLICATIONS

European Search Report dated Jul. 30, 2019.

*Primary Examiner* — Edward Tso
*Assistant Examiner* — Ahmed H Omar
(74) *Attorney, Agent, or Firm* — Cha & Reiter, LLC.

(57) ABSTRACT

The present invention relates to an electronic device, and to an electronic device and method for controlling wireless charging. To this end, a wireless power reception device according to the present invention comprises: a power reception unit for wirelessly receiving power from a wireless power transmission device; a power source unit charged with the received power; and a processor, wherein the processor can be configured to: measure the temperature according to the received power; measure at least one of a frequency, a voltage, and transmission power of a transmission coil in the wireless power transmission device when the measured temperature is higher than that of a first threshold; identify whether alignment with the wireless power transmission device is in a match state or a mismatch state by comparing the measured value and a preset value; transmit, to the wireless power transmission device, a first control signal for controlling power to be received from the wireless (Continued)

power transmission device when the alignment is in a mismatch state; and receive power controlled based on the transmitted first control signal.

15 Claims, 10 Drawing Sheets

(51) Int. Cl.
  *H02J 50/80* (2016.01)
  *H02J 50/10* (2016.01)
(58) Field of Classification Search
  USPC .......................................................... 320/108
  See application file for complete search history.

(56) References Cited

U.S. PATENT DOCUMENTS

| | | |
|---|---|---|
| 2015/0162755 A1 | 6/2015 | Inoue et al. |
| 2016/0020626 A1 | 1/2016 | Lee et al. |
| 2016/0020630 A1 | 1/2016 | Tseng et al. |
| 2016/0020637 A1 | 1/2016 | Khlat |
| 2016/0075240 A1* | 3/2016 | Inoue ...................... B60L 53/60 320/108 |
| 2016/0118808 A1* | 4/2016 | Van Wageningen ........................ H05B 6/1236 307/104 |
| 2016/0134129 A1 | 5/2016 | Watanabe et al. |

FOREIGN PATENT DOCUMENTS

| | | |
|---|---|---|
| KR | 10-1220296 B1 | 1/2013 |
| KR | 10-1228105 B1 | 2/2013 |
| KR | 10-2014-0060110 A | 5/2014 |
| KR | 10-2015-0085630 A | 7/2015 |
| KR | 10-2016-0023103 A | 3/2016 |
| WO | 2015/148703 A1 | 10/2015 |
| WO | 2016/118903 A1 | 7/2016 |

* cited by examiner

ELECTRONIC DEVICE AND METHOD FOR CONTROLLING WIRELESS CHARGING

CROSS-REFERENCE TO RELATED APPLICATION(S)

This application is a National Phase Entry of PCT International Application No. PCT/KR2017/010404, which was filed on Sep. 21, 2017 and claims priority under 35 U.S.C. § 119 of Korean Patent Application No. 10-2016-0128876, filed on Oct. 6, 2016, in the Korean Intellectual Property Office the disclosure of which is incorporated herein by reference in its entirety.

TECHNICAL FIELD

The disclosure relates to an electronic device, and more particularly to an electronic device and a method for controlling wireless charging.

BACKGROUND ART

Electronic devices have come to provide a wide variety of services and additional functions. In order to raise the utility value of electronic devices and meet the various needs of users, electronic devices are being continuously developed. In one example to meet the needs of users, an electronic device (e.g., a wireless power reception device) may be wirelessly supplied with power from a charging device (e.g., a wireless power transmission device) that supplies power, and the charging device may provide wireless charging for the electronic device.

Conventionally, in providing wireless charging for an electronic device, when charging is provided, a charging current is limited or released according to temperature without considering the alignment of a wireless power reception device with a wireless power transmission device.

DETAILED DESCRIPTION OF THE INVENTION

Technical Problem

In the conventional method, whether a wireless power reception device is aligned or misaligned with a wireless power transmission device is not determined. When wireless charging continues in a misaligned state, a heat-generating temperature substantially increases. However, when a charging current setting value is set to a low value in order to solve the heat generation problem, the charging time is increased.

Therefore, it is necessary to determine whether a wireless power reception device is aligned with a wireless power transmission device. Also, it is necessary to control heat generation when a wireless power reception device is misaligned with a wireless power transmission device.

Technical Solution

In accordance with various embodiments of the disclosure, a wireless power reception device may include: a power reception unit configured to wirelessly receive power from a wireless power transmission device; a power source unit configured to be charged with the received power; and a processor, wherein the processor may be configured to: measure temperature resulting from the received power, measure at least one of a frequency, voltage, and transmitted power of a transmission coil of the wireless power transmission device when the measured temperature is greater than a first threshold value, identify whether an arrangement relative to the wireless power transmission device is an aligned state or a misaligned state by comparing the measured value with a preset value, transmit a first control signal for controlling the power received from the wireless power transmission device to the wireless power transmission device when the arrangement is the misaligned state, and receive power controlled based on the transmitted first control signal.

In accordance with various embodiments of the disclosure, a method for controlling wireless charging of a wireless power reception device may include: wirelessly receiving power from a wireless power transmission device; measuring a temperature resulting from the received power; measuring at least one of a frequency, voltage, and transmitted power of a transmission coil of the wireless power transmission device when the measured temperature is greater than a first threshold value; identifying whether an arrangement relative to the wireless power transmission device is an aligned state or a misaligned state by comparing the measured value with a preset value; transmitting a first control signal for controlling the power received from the wireless power transmission device to the wireless power transmission device when the arrangement is the misaligned state; and receiving power controlled based on the transmitted first control signal.

In accordance with various embodiments of the disclosure, a computer-readable storage medium may store a program including instructions to control power in a wireless power reception device including a power reception unit, a power source unit, and a processor, wherein the instructions may include: a first instruction set to wirelessly receive power from a wireless power transmission device; a second instruction set to measure a temperature resulting from the received power; a third instruction set to measure at least one of a frequency, voltage, and transmitted power of a transmission coil of the wireless power transmission device when the measured temperature is greater than a first threshold value; a fourth instruction set to identify whether an arrangement relative to the wireless power transmission device is an aligned state or a misaligned state by comparing the measured value with a preset value; a fifth instruction set to transmit a first control signal for controlling the power received from the wireless power transmission device to the wireless power transmission device when the arrangement is the misaligned state; and a sixth instruction set to receive power controlled based on the transmitted first control signal.

Advantageous Effects

According to various embodiments of the disclosure, it is possible to determine whether a wireless power reception device is aligned or misaligned with a wireless power transmission device by measuring a heat-generating temperature from the wireless charging reception device and by measuring at least one of the frequency, voltage, and transmitted power of a transmission power of the wireless power transmission device during wireless charging. Further, when the measured temperature is higher than a threshold value in the misaligned state, a control signal for controlling power received from the wireless power transmission device may be transmitted to the wireless power transmission device, thereby adjusting the power output from the wireless power transmission device.

Further, the disclosure may adjust the power output from the wireless power transmission device in the misaligned state, thereby reducing the heat-generating temperature. In addition, it is possible to variously adjust the charging current in the misaligned state.

Figure 9A:
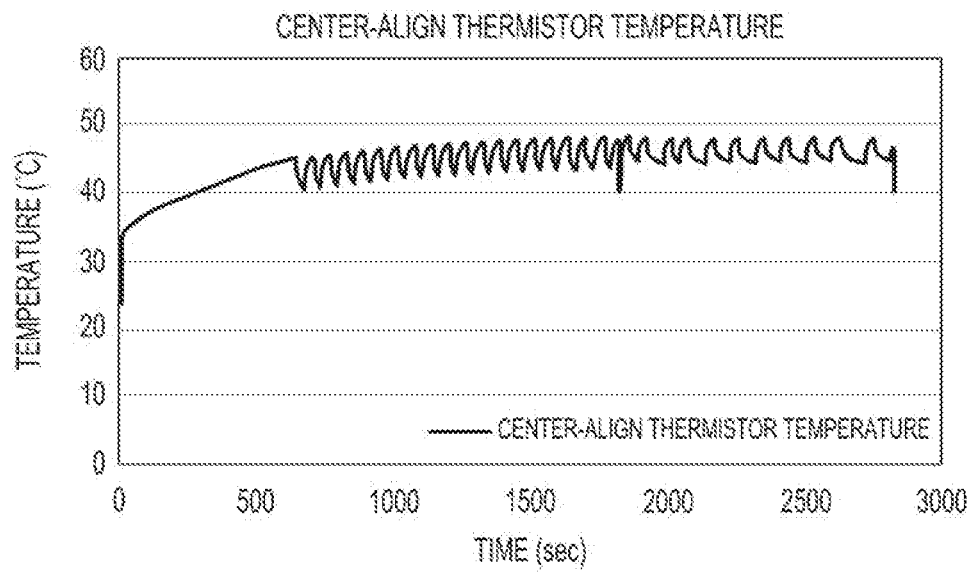
Figure 9B:
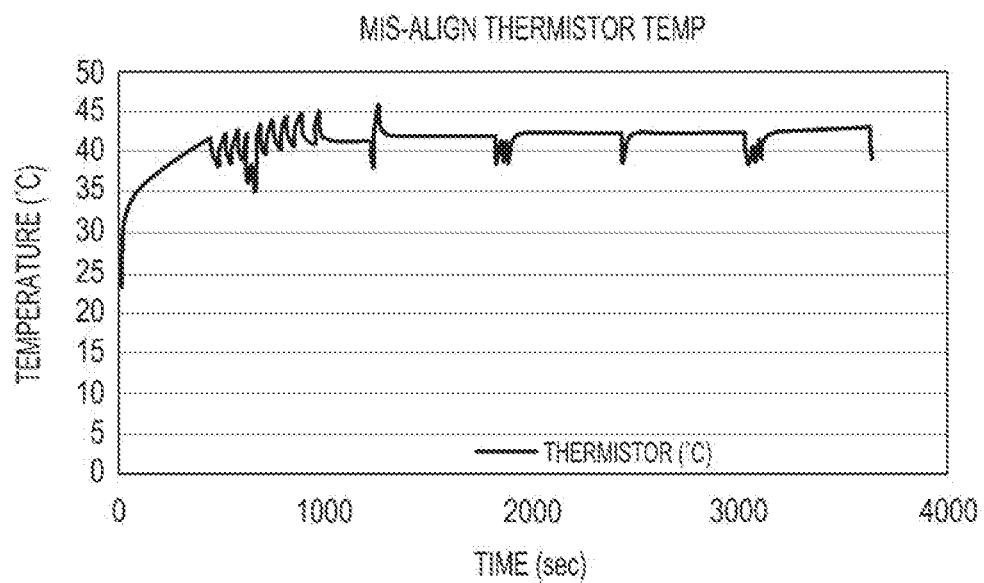
Figure 10:
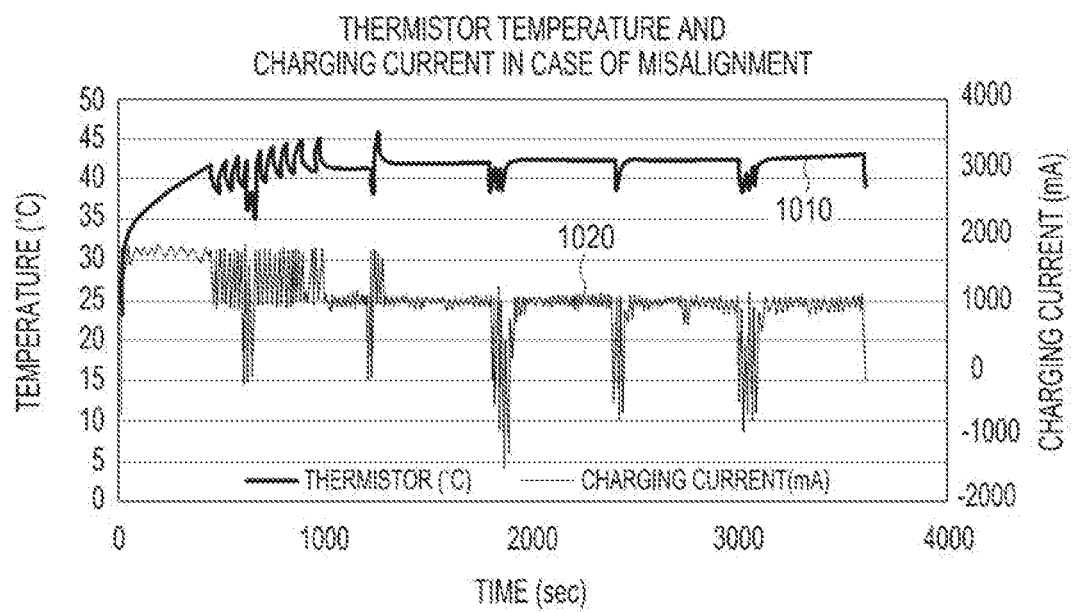
Figure 11:
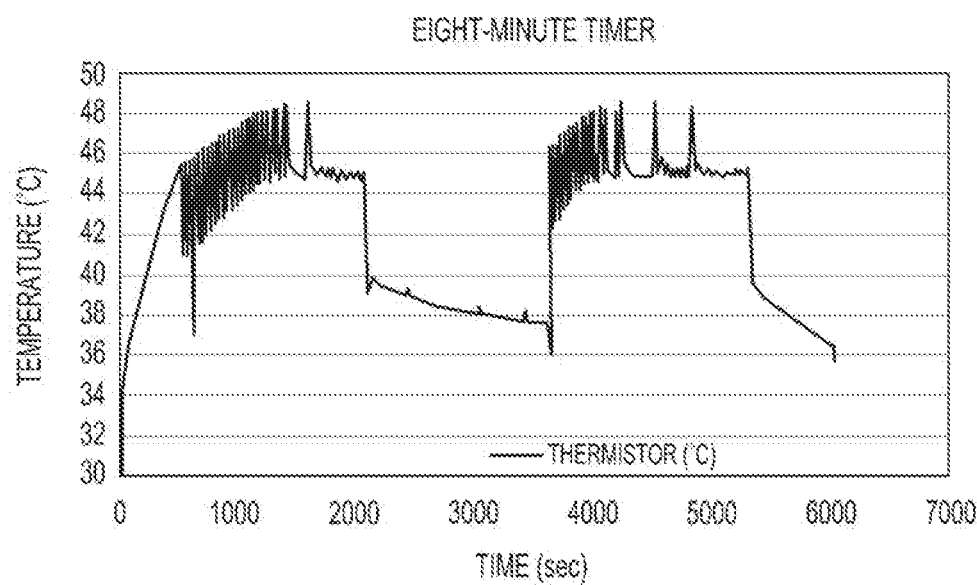

(a) of FIG. 8 illustrates that a wireless power reception device is aligned on a wireless power transmission device according to various embodiments of the disclosure;

(b) of FIG. 8 illustrates that a wireless power reception device is misaligned on a wireless power transmission device according to various embodiments of the disclosure;

FIG. 9A illustrates a temperature measured when a wireless power reception device is aligned on a wireless power transmission device according to an embodiment of the disclosure;

FIG. 9B illustrates a temperature that is measured when the wireless power reception device is misaligned on the wireless power transmission device according to an embodiment of the disclosure;

FIG. 10 illustrates a relationship between a heat-generating temperature 1010 and a charging current 1020 in the state in which a wireless power reception device is misaligned on a wireless power transmission device according to an embodiment of the disclosure; and FIG. 11 illustrates a temperature change due to wireless charging by operating a timer according to an embodiment of the disclosure.

MODE FOR CARRYING OUT THE INVENTION

Hereinafter, various embodiments of the disclosure will be described with reference to the accompanying drawings. However, it should be understood that there is no intent to limit the disclosure to the particular forms disclosed herein; rather, the disclosure should be construed to cover various modifications, equivalents, and/or alternatives of embodiments of the disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The smart home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, a charging device and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the disclosure is not limited to the aforementioned devices, and may include a new electronic device according to the development of technology.

Hereinafter, an electronic device according to various embodiments will be described with reference to the accompanying drawings. In the disclosure, the term "user" may indicate a person using an electronic device or a device (e.g., an artificial intelligence electronic device) using an electronic device.

Figure 1:
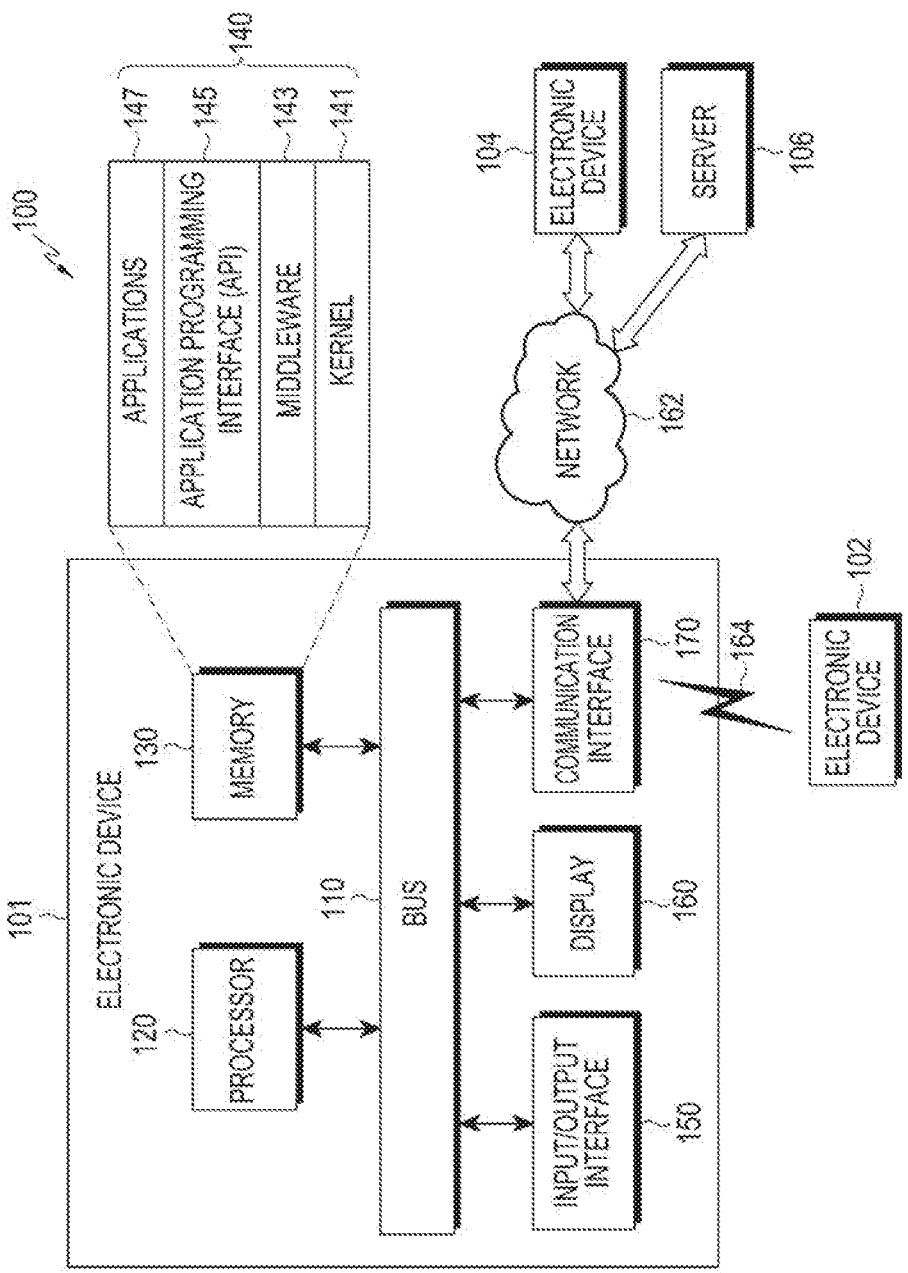
FIG. 1 illustrates an electronic device 101 in a network environment 100 according to various embodiments.

FIG. 1 illustrates an electronic device 101 in a network environment 100 according to various embodiments.

The electronic device 101 may include a bus 110, a processor 120, a memory 130, an input/output interface 150, a display 160, and a communication interface 170. In some embodiments, at least one of the components may be omitted, or additional components may be further included in the electronic device 101.

The bus 110 may include, for example, a circuit that connects the components 110 to 170 to each other and delivers communications (e.g., control messages and/or data) between the components.

The processor 120 may include one or more of a Central Processing Unit (CPU), an Application Processor (AP), and a Communication Processor (CP). The processor 120 may control, for example, at least one different component of the electronic device 101, and/or may perform operations relating to communication or data processing.

The memory 130 may include volatile and/or nonvolatile memory. The memory 130 may store, for example, a command or data related to at least one different component of the electronic device 101. According to one embodiment, the memory 130 may store software and/or a program 140. The program 140 may include, for example, a kernel 141, middleware 143, an Application Programming Interface (API) 145, and/or an application (or "app") 147. At least part of the kernel 141, the middleware 143, and the API 145 may be designated as an Operating System (OS).

The kernel 141 may control or manage system resources (e.g., the bus 110, the processor 120, the memory 130, or the like) used to perform an operation or function implemented in other programs (e.g., the middleware 143, the API 145, or the application 147). Further, the kernel 141 may provide an interface that allows the middleware 143, the API 145, or the application 147 to access individual components of the electronic device 101 to thereby control or manage system resources.

The middleware 143 may serve as a relay so that, for example, the API 145 or the application 147 communicates with the kernel 141 to exchange data.

Further, the middleware 143 may process one or more requests for operations received from the application 147 according to the priority thereof. For example, the middleware 143 may assign at least one application 147 priority for using system resources of the electronic device 101 (e.g., the bus 110, the processor 120, the memory 130, or the like). For example, the middleware 143 may process the one or more requests for operations according to the priority assigned to the at least one application, thereby performing scheduling or load balancing for the one or more requests for operations.

The API 145 is, for example, an interface for the application 147 to control a function provided from the kernel 141 or the middleware 143, and may include, for example, at least one interface or function (e.g., a command) for file control, window control, image processing, or text control.

The input/output interface 150 may serve as an interface that delivers a command or data, which is input from, for example, a user or a different external device, to a different component(s) of the electronic device 101. Further, the input/output interface 150 may output a command or data, which is received from a different component(s) of the electronic device 101, to the user or to the different external device.

The display 160 may include, for example, a Liquid Crystal Display (LCD), a Light-Emitting Diode (LED) display, an Organic Light-Emitting Diode (OLED) display, a Micro-Electro-Mechanical Systems (MEMS) display, or an electronic paper display. The display 160 may display, for example, various types of content (e.g., text, an image, a video, an icon, a symbol, or the like) for the user. The display 160 may include a touch screen and may receive touch, gesture, proximity, or hovering input using, for example, an electronic pen or a body part of a user.

The communication interface 170 may establish communication, for example, between the electronic device 101 and an external device (e.g., a first external electronic device 102, a second external electronic device 104, or a server 106). For example, the communication interface 170 may be connected to a network 162 via wireless communication or wired communication to communicate with the external device (e.g., the second external electronic device 104 or the server 106).

The wireless communication may use, for example, a cellular communication protocol, which may be, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). Further, the wireless communication may include, for example, short-range communication 164. The short-range communication 164 may include, for example, at least one of Wireless Fidelity (Wi-Fi), Bluetooth, Near-Field Communication (NFC), and Global Navigation Satellite System (GNSS). The GNSS may include, for example, at least one of a Global Positioning System (GPS), a Global Navigation Satellite System (GLONASS), a BeiDou Navigation Satellite System (hereinafter, "BeiDou"), and Galileo, which is the European global satellite-based navigation system, depending on the use area or bandwidth. In the present document, "GPS" may be interchangeably used with "GNSS" hereinafter. The wired communication may include, for example, at least one of Universal Serial Bus (USB), High-Definition Multimedia Interface (HDMI), Recommended Standard 232 (RS-232), and Plain Old Telephone Service (POTS). The network 162 may include a telecommunications network, which may be, for example, at least one of a computer network (e.g., a Local Area Network (LAN) or Wide Area Network (WAN)), the Internet, and a telephone network.

Each of the first and second external electronic devices 102 and 104 may be a device of a type that is the same as, or different from, that of the electronic device 101. According to one embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to one embodiment, when the electronic device 101 needs to perform a function or service automatically or upon request, the electronic device 101 may request another electronic device (e.g., the electronic device 102 or 104, or the server 106) to perform at least some functions related to the function or service, instead of, or in addition to, autonomously performing the function or service. The other electronic device (e.g., the electronic device 102 or 104, or the server 106) may perform the requested functions or additional functions and may transmit the result of execution thereof to the electronic device 101. The electronic device 101 may provide the requested function or service using the same received result or after additionally processing the result. To this end, cloud-computing, distributed-computing, or client-server-computing technologies may be used.

Figure 2:
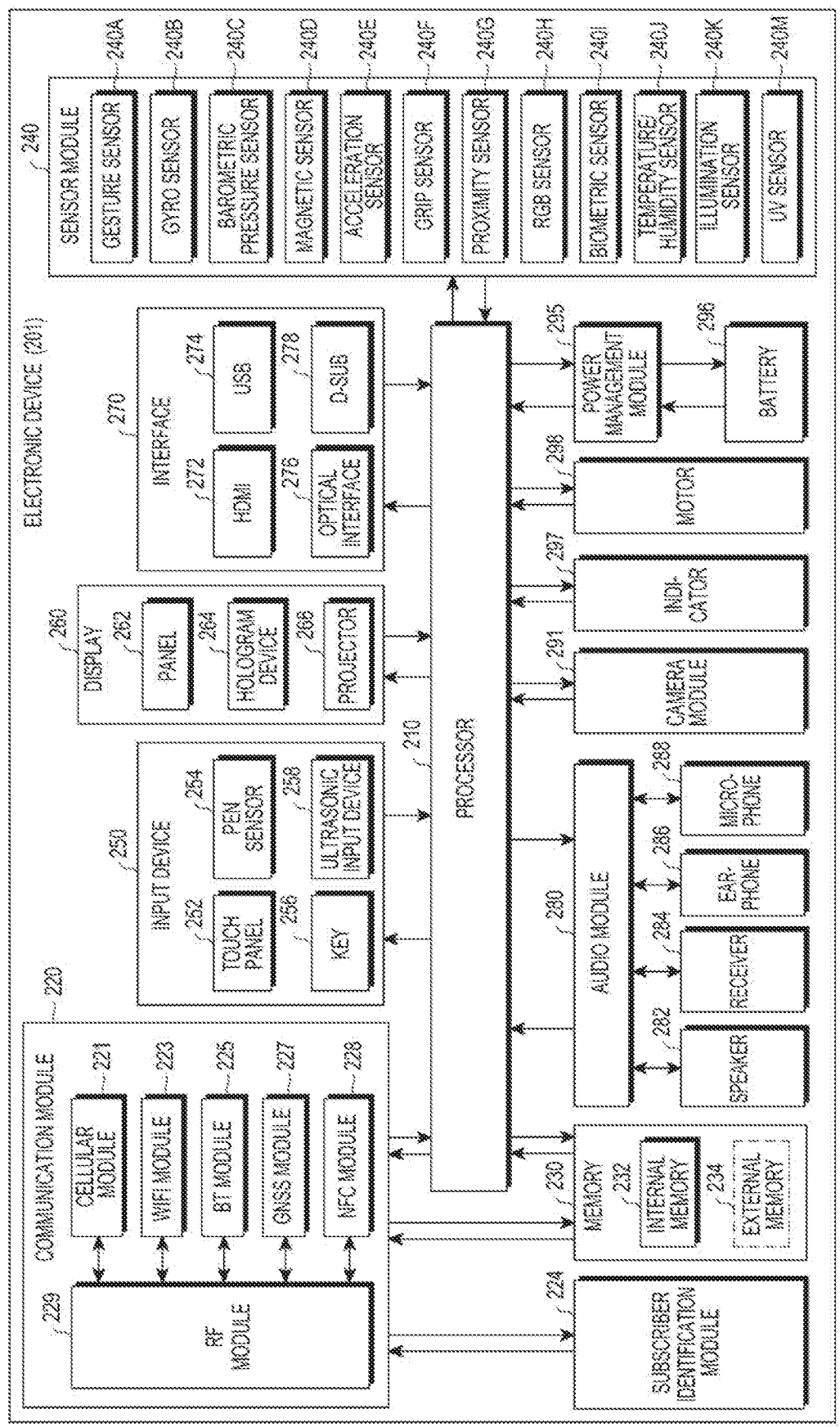
FIG. 2 is a block diagram illustrating an electronic device 201 according to various embodiments.

FIG. 2 is a block diagram illustrating an electronic device 201 according to various embodiments.

The electronic device 201 may include, for example, all or part of the electronic device 101 illustrated in FIG. 1. The electronic device 201 may include one or more processors (e.g., Application Processors (APs)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processors 210 may run, for example, an operating system or an application to control a plurality of hardware or software components that are connected to the processors 210, and may perform various kinds of data processing and operations. The processors 210 may be configured as, for example, a System on Chip (SoC). According to one embodiment, the processors 210 may further include a Graphic Processing Unit (GPU) and/or an image signal processor. The processors 210 may include at least some (e.g., a cellular module 221) of the components illustrated in FIG. 2. The processors 210 may load a command or data received from at least one of other components (e.g., nonvolatile memory) into volatile memory to process the command or data, and may store various types of data in the nonvolatile memory.

The communication module 220 may have a configuration that is the same as, or similar to, that of the communication interface 170 in FIG. 1. The communication module 220 may include, for example, a cellular module 221, a Wi-Fi module 223, a Bluetooth module 225, a global navigation satellite system (GNSS) module 227 (e.g., a global positioning system (GPS) module, a GLONASS module, a BeiDou module, or a Galileo module), a Nearfield Communication (NFC) module 228, and a radio frequency (RF) module 229.

The cellular module 221 may provide, for example, a voice call, a video call, a text messaging service, or an Internet service through a communication network. According to one embodiment, the cellular module 221 may perform identification and authentication of the electronic device 201 in a communication network using a Subscriber Identity Module (SIM, for example, a SIM card) 224. According to one embodiment, the cellular module 221 may perform at least some of the functions provided by the processors 210. According to one embodiment, the cellular module 221 may include a Communication Processor (CP).

Each of the Wi-Fi module 223, the Bluetooth module 225, the GNSS module 227, and the NFC module 228 may include a processor to process data transmitted and received via the respective modules. According to one embodiment, at least some (e.g., two or more) of the cellular module 221, the Wi-Fi module 223, the Bluetooth module 225, the GNSS module 227, and the NFC module 228 may be included in one Integrated Chip (IC) or IC package.

The RF module 229 may transmit and receive, for example, a communication signal (e.g., an RF signal). The RF module 229 may include, for example, a transceiver, a Power Amplifier (amp) Module (PAM), a frequency filter, a Low-Noise Amplifier (LNA), an antenna, or the like. According to another embodiment, at least one of the cellular module 221, the Wi-Fi module 223, the Bluetooth module 225, the GNSS module 227, and the NFC module 228 may transmit and receive an RF signal through a separate RF module.

The SIM 224 may include, for example, a card including a SIM and/or an embedded SIM, and may include unique identification information (e.g., an Integrated Circuit Card Identifier (ICCID)) or subscriber information (e.g., an International Mobile Subscriber Identity (IMSI)).

The memory 230 (e.g., the memory 130) may include, for example, internal memory 232 or external memory 234. The internal memory 232 may include, for example, at least one of a volatile memory (e.g., a Dynamic Random-Access Memory (DRAM), a Static RAM (SRAM), a Synchronous Dynamic RAM (SDRAM), or the like) and a nonvolatile memory (e.g., a One-Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., an NAND flash, an NOR flash, or the like), a hard drive, or a Solid-State Drive (SSD)).

The external memory 234 may further include a flash drive, for example, a Compact Flash (CF), a Secure Digital (SD), a micro Secure Digital (micro-SD), a mini Secure Digital (mini-SD), an extreme digital (xD), a Multi-Media Card (MMC), a memory stick, or the like. The external memory 234 may be functionally and/or physically connected to the electronic device 201 through any of various interfaces.

The sensor module 240 may measure, for example, physical quantities, or may detect the state of operation of the electronic device 201 and convert measured or detected information into an electrical signal. The sensor module 240 may include, for example, at least one of a gesture sensor 240A, a gyro sensor 240B, a barometric pressure sensor 240C, a magnetic sensor 240D, an accelerometer 240E, a grip sensor 240F, a proximity sensor 240G, a color sensor 240H (e.g., a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one embodiment, the electronic device 201 may further include a processor configured, as a part of the processors 210 or separately from the processors 210, to control the sensor module 240, thereby controlling the sensor module 240 while the processors 210 are in a sleep state.

The input device 250 may include, for example, a touch panel 252, a (digital) pen sensor 254, a key 256, or an ultrasonic input device 258. The touch panel 252 may be, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response.

The (digital) pen sensor 254 may, for example, be part of the touch panel or may include a separate recognition sheet. The key 256 may include, for example, a physical button, an optical key, or a keypad. The ultrasonic input device 258 may detect ultrasonic waves generated in an input tool through a microphone (e.g., a microphone 288) and may identify data corresponding to the detected ultrasonic waves.

The display 260 (e.g., the display 160) may include a panel 262, a hologram device 264, or a projector 266. The panel 262 may include a configuration that is the same as, or similar to, that of the display 160 of FIG. 1. The panel 262 may be configured to be, for example, flexible, transparent, or wearable. The panel 262 may be formed with the touch panel 252 in a single module. The hologram device 264 may display a three-dimensional image in the air using light interference. According to one embodiment, the panel 262 may include a pressure sensor (or a force sensor, the terms being interchangeably used hereinafter) to measure the strength of pressure of a user's touch. The pressure sensor may be formed with the touch panel 252 in a single body, or may be provided as one or more sensors separate from the touch panel 252. The projector 266 may project light onto a screen to display an image. The screen may be disposed, for example, inside or outside the electronic device 201. According to one embodiment, the display 260 may further include a control circuit to control the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) interface 278. The interface 270 may be included, for example, in the communication interface 170 illustrated in FIG. 1. Additionally or alternatively, the interface 270 may include, for example, a Mobile High-Definition Link (MHL) interface, a Secure Digital (SD) card/Multi-Media Card (MMC) interface, or an Infrared Data Association (IrDA) interface.

The audio module 280 may bidirectionally convert, for example, a sound and an electrical signal. At least some components of the audio module 280 may be included, for example, in the input/output interface 145 illustrated in FIG. 1. The audio module 280 may process sound information input or output, for example, through a speaker 282, a receiver 284, earphones 286, or the microphone 288.

The camera module 291 is a device that takes, for example, a still image and a video. According to one embodiment, the camera module 291 may include one or more image sensors (e.g., a front sensor or a rear sensor), a lens, an Image Signal Processor (ISP), or a flash (e.g., an LED, a xenon lamp, or the like).

The power management module 295 may manage, for example, the power of the electronic device 201. The electronic device 201 may be an electronic device supplied with power through a battery but is not limited thereto. According to one embodiment, the power management module 295 may include a Power Management Integrated Circuit (PMIC), a charger Integrated Circuit (IC), or a battery or fuel gauge. The PMIC may have wired and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or the temperature of the battery 296. The battery 296 may include, for example, a rechargeable battery and/or a solar battery.

The indicator 297 may display the specific state of the electronic device 201 or a component thereof (e.g., the processors 210), which may be, for example, a booting state, a message state, or a charging state. The motor 298 may convert an electrical signal into mechanical vibrations, and may generate vibrations or a haptic effect. Although not shown, the electronic device 201 may include a processing device for supporting a mobile TV (e.g., a GPU). The processing device for supporting the mobile TV may process media data in accordance with Digital Multimedia Broadcasting (DMB), Digital Video Broadcasting (DVB), or mediaFlo™ standards.

Each of the above-described component elements of hardware according to the disclosure may be configured with one or more components, and the names of the corresponding component elements may vary based on the type of electronic device. The electronic device according to various embodiments of the disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
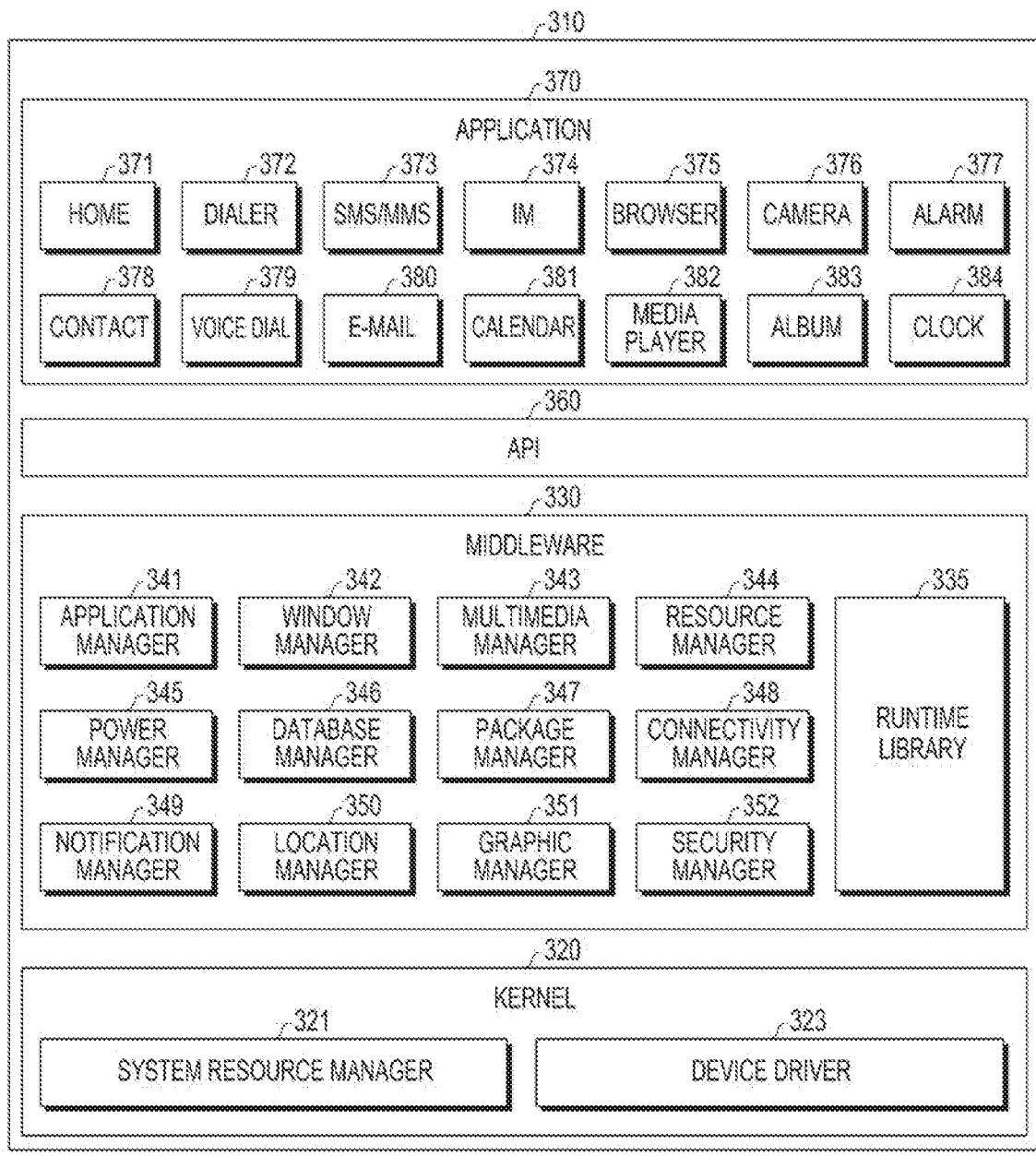
FIG. 3 is a block diagram illustrating a program module according to various embodiments.

FIG. 3 is a block diagram illustrating a program module according to various embodiments.

According to one embodiment, the program module 310 (e.g., the program 140) may include an Operating System (OS) that controls resources related to an electronic device (e.g., the electronic device 101) and/or various applications (e.g., the application 147) that run on the OS. The OS may be, for example, Android™, iOS™, Windows™, Symbian™, Tizen™, Samsung Bada™, or the like.

The program module 310 may include a kernel 320, middleware 330, an API 360, and/or an application 370. At least part of the program module 310 may be preloaded onto the electronic device, or may be downloaded from an external electronic device (e.g., the electronic device 102 or 104, the server 106, or the like).

The kernel 320 (e.g., the kernel 141) may include, for example, a system resource manager 321 and/or a device driver 323. The system resource manager 321 may perform control, allocation, or recovery of system resources. According to one embodiment, the system resource manager 321 may include a process management unit, a memory management unit, or a file-system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, functions commonly needed for applications 370, or may provide the applications 370 with various functions through the API 360 so that the applications 370 may efficiently use the limited systems resources in the electronic device. According to one embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier to add a new function through a programming language while the application 370 is running. The runtime library 335 may perform functions for input/output management, memory management, or arithmetic functions.

The application manager 341 may manage, for example, the life cycle of at least one application among the applications 370. The window manager 342 may manage graphic user interface (GUI) resources used for a screen. The multimedia manager 343 may identify formats that are necessary to play various media files, and may encode or decode a media file using a codec suitable for a corresponding format. The resource manager 344 may manage resources, such as source code, memory, or storage space, for at least one application among the applications 370.

The power manager 345 may operate with, for example, a basic input/output system (BIOS) to manage a battery or power supply and may provide information on power necessary for operation of the electronic device. The database manager 346 may generate, retrieve, or change a database to be used for at least one application among the applications 370. The package manager 347 may install or update an application distributed in the form of a package file.

The connectivity manager 348 may manage wireless connectivity via, for example, Wi-Fi or Bluetooth. The notification manager 349 may display or report an incoming message, an appointment, and an event including a proximity notification in a manner that does not disturb a user. The location manager 350 may manage position information on the electronic device. The graphic manager 351 may manage a graphic effect to be provided for the user or a user interface related to the graphic effect. The security manager 352 may provide overall security functions necessary for system security or user authentication. According to one embodiment, when the electronic device (e.g., the electronic device 101) has phone features, the middleware 330 may further include a telephony manager to manage a voice or video call function of the electronic device.

The middleware 330 may include a middleware module that forms combinations of various functions of the foregoing components. The middleware 330 may provide a specialized module for each OS in order to provide differentiated functions. Further, the middleware 330 may dynamically delete some existing components or add new components.

The API 360 (e.g., the API 145) is, for example, a set of API programming functions, and may be provided with a different configuration depending on the OS. For example, one API set for each platform may be provided in the case of Android or iOS, while two or more API sets for each platform may be provided in the case of Tizen.

The application 370 (e.g., the application 147) may include one or more applications that are capable of performing functions of, for example, a home screen 371, a dialer 372, SMS/MMS 373, instant messaging (IM) 374, a browser 375, a camera 376, an alarm 377, an address book 378, a voice dialer 379, email 380, a calendar 381, a media player 382, an album 383, a clock 384, or healthcare (e.g., for measuring exercise or blood sugar), an environmental data application (e.g., for providing atmospheric pressure, humidity, or temperature data), or the like.

According to one embodiment, the application 370 may include an application (hereinafter, "information exchange application" for convenience of description) that supports information exchange between the electronic device (e.g., the electronic device 101) and an external electronic device (e.g., the electronic device 102 or 104). The information exchange application may include, for example, a notification relay application for relaying specific information to the external electronic device or a device management application for managing the external electronic device.

For example, the notification relay application may include a function of relaying notification information, which is generated in another application (e.g., an SMS/MMS application, an email application, a healthcare application, an environmental data application, or the like) of the electronic device, to the external electronic device (e.g., the electronic device 102 or 104). Additionally, the notification relay application may receive notification information, for example, from the external electronic device and may provide the notification information to the user.

The device management application may manage (e.g., install, delete, or update), for example, at least one function (e.g., a function of turning on/turning off the external electronic device itself (or some components) or adjusting the brightness (or resolution) of a display) of the external electronic device (e.g., the electronic device 102 or 104) communicating with the electronic device, an application operating in the external electronic device, or a service (e.g., a call service or message service) provided by the external electronic device.

According to one embodiment, the application 370 may include an application (e.g., a healthcare application of a mobile medical device) assigned according to the attributes of the external electronic device (e.g., the electronic device 102 or 104). According to one embodiment, the application 370 may include an application received from the external electronic device (e.g., the server 106 or the electronic device 102 or 104). According to one embodiment, the application 370 may include a preloaded application or a third-party application that may be downloaded from a server. The illustrated components of the program module 310, according to the embodiments, may be termed differently depending on the OS.

According to various embodiments, at least part of the program module 310 may be implemented in software, firmware, hardware, or combinations of at least two or more thereof. At least part of the program module 310 may be implemented (e.g., run) by, for example, a processor (e.g., the processor 210). At least part of the program module 310 may include, for example, a module, a program, a routine, sets of instructions, or a process to perform one or more functions.

Figure 4:
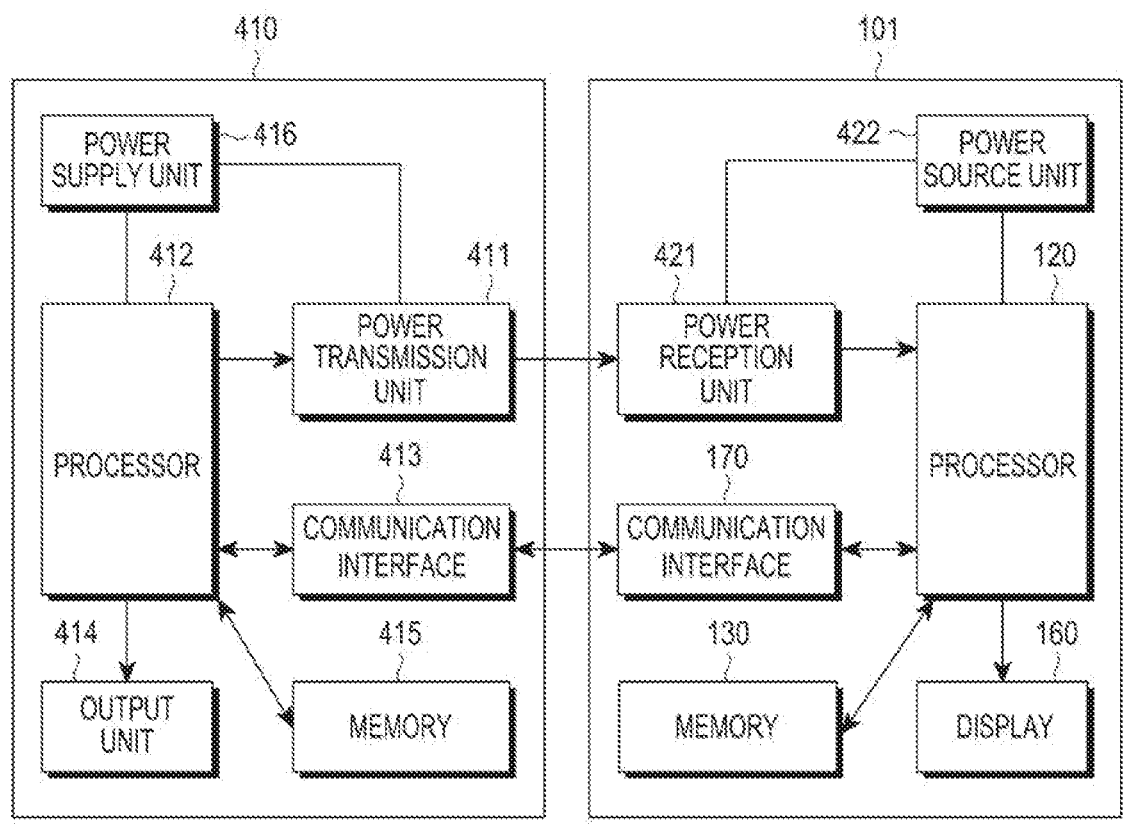
FIG. 4 is a block diagram illustrating a wireless power transmission device and a wireless power reception device according to various embodiments of the disclosure.

FIG. 4 is a block diagram illustrating a wireless power transmission device and a wireless power reception device according to various embodiments of the disclosure.

As illustrated in FIG. 4, the wireless power transmission device 410 may include a power transmission unit 411, a processor 412, a communication interface 413, an output unit 414, a memory 415, and a power supply unit 416. The wireless power transmission device 410 according to various embodiments of the disclosure may provide power, for example, to at least one electronic device 101 (e.g., a wireless power reception device) having a battery or a power source unit, and may be referred to as a charger. The power transmission unit 411 may include at least one induction coil and at least one resonance coil.

According to various embodiments, the power transmission unit 411 may provide power required by the wireless power reception device 101 and may wirelessly provide power to the wireless power reception device 101. The power transmission unit 411 may supply power in the form of an AC waveform, or may convert DC power into an AC waveform using an inverter and may supply the power in the AC waveform to the wireless power reception device 101. Those skilled in the art will readily understand that the power transmission unit 411 is not limited as long as it can provide power in the AC waveform.

According to various embodiments, the communication interface 413 may communicate with the wireless power reception device 101 in a predetermined mode. The communication interface 413 may receive power information from the wireless power reception device 101. Here, the power information may include at least one of output voltage information and charging current information of the wireless power reception device 101. Alternatively, the power information may include information about the insertion of a wired charging terminal, a switch from a Stand-Alone (SA) mode to a Non-Stand-Alone (NSA) mode, release from an error condition, a control signal for controlling wireless charging, the charging frequency, the voltage, and the measured value of transmitted power of a transmission coil included in the power transmission unit 411. The wireless power transmission device 410 may adjust the power supplied to the wireless power reception device 101 on the basis of the received power information.

The communication interface 413 may transmit a charging function control signal to control a charging function of the wireless power reception device 101. The communication interface 413 may perform communication with the wireless power reception device 101 through in-band communication using a load modulation scheme and out-band communication using Bluetooth Low Energy (BLE). The communication interface 413 may perform communication with the wireless power reception device 101 through a different frequency (out-band) from the frequency of a wireless power signal. The charging function control signal may be a control signal for controlling a power reception unit 421 of the particular wireless power reception device 101 to enable or disable the charging function. Further, the charging function control signal may be information related to cross connection determination according to various embodiments of the disclosure. For example, the charging function control signal may include identification information and configuration information for cross connection determination, and may include pattern or time information related to a load change of the wireless power reception device 101 for cross connection determination. The communication interface 413 may receive a signal not only from the wireless power reception device 101 but also from another wireless power transmission device (not shown).

According to various embodiments, the communication interface 413 may communicate with a communication interface 170 of the wireless power reception device 101, and may bidirectionally perform communication via a frequency of 2.4 GHz (e.g., Wi-Fi, ZigBee, or BT/BLE). The communication interface 413 may transmit a signal (e.g., a power beacon) to the wireless power reception device 101 under the control of the processor 412, and may receive a response (e.g., a broadcast signal) to the transmission of the signal. The wireless power transmission device 410 may transmit the signal to the wireless power reception device 101 and may receive the response to the transmitted signal via the communication interface 413 (e.g., BLE).

According to various embodiments, a controller 112 may apply a power beacon for detecting induction to an induction coil of an induction coil unit 111$b$ according to an in-band method.

According to various embodiments, the power supply unit 416 may receive AC power (e.g., 220 V) from the outside and may convert the received AC power into DC power. The power supply unit 416 may generally be supplied with power from the outside by inserting a terminal (e.g., an adapter) into a wall outlet. For example, the power supply unit 416 may convert 220 V AC power, supplied from the outside, into 5 V or 9 V DC power. The power supply unit 416 may include a variable DC/DC device capable of boosting the converted 5 V or 9 V DC power to 10V to 20V.

According to various embodiments, the processor 412 may control the overall operation of the wireless power transmission device 410. The processor 412 may control the overall operation of the wireless power transmission device 410 using an algorithm, a program, or an application required for control, which is read from the memory 415. The processor 412 may be configured in the form of a CPU, a microprocessor, or a minicomputer. The processor 412 may control, for example, at least one different component of the wireless power transmission device 410, may perform an operation relating to communication or data processing, and/or may implement or control a wireless charging transmission and reception mode through a coil. The processor 412 may control a power transmission mode for supplying power to the wireless power reception device 101, and may select a coil corresponding to the wireless power reception device from among a plurality of coils.

According to various embodiments, the processor 412 may display the condition of the wireless power reception device 101 on the output unit 414 on the basis of a signal received from the wireless power reception device 101 via the communication interface 413. Also, the processor 412 may display, on the output unit 414, the estimated time for the wireless power reception device 101 to complete charging. When various pieces of information (e.g., information indicating an aligned or misaligned state) are received from the wireless power reception device 101, the processor 412 may provide the information to a user via a notification (e.g., vibrations, a sound, or a display on the screen) according to the received information.

Referring to FIG. 4, the wireless power reception device 101 may include the power reception unit 421, a processor 120, a communication interface 170, a power source unit 422, a display 160, and a memory 130.

According to various embodiments, the power reception unit 421 may wirelessly receive power transmitted from the wireless power transmission unit 410. Here, the power reception unit 421 may receive the power in the form of an AC waveform. The received power may be charged in the power source unit 422 under the control of the processor 120.

According to various embodiments, the processor 120 may control the overall operation of the wireless power reception device 101. The processor 120 may control the overall operation of the wireless power reception device 101 using an algorithm, a program, or an application required for control, which is read from the memory 130. The processor 120 may be configured in the form of a CPU, a microprocessor, or a minicomputer. The processor 120 may measure the charging frequency and the voltage of the transmission coil included in the power transmission unit 411 of the wireless power transmission device 410 and the power received from the wireless power transmission device 410 and may transmit the measurement results to the wireless power transmission device 410 through the communication interface 170.

According to various embodiments, the communication interface 170 may communicate with the wireless power transmission device 410 in a predetermined mode. When a power beacon is received from the wireless power transmission device 410, the communication interface 170 may transmit power information to the wireless power transmission device 410. Here, the power information may include at least one of output voltage information and charging current information of the wireless power reception device 101. Alternatively, the power information may include information about the insertion of a wired charging terminal, a switch from the Stand-Alone (SA) mode to the Non-Stand-Alone (NSA) mode, release from an error condition, a control signal for power control, the charging frequency, the voltage, and the measured value of transmitted power of the transmission coil included in the power transmission unit 411.

The communication interface 170 may transmit a charging function control signal to control a charging function of the wireless power reception device 101. As will be described in detail below, the power information may include information about the insertion of a wired charging terminal, a switch from the Stand-Alone (SA) mode to the Non-Stand-Alone (NSA) mode, and release from an error condition. The charging function control signal may be information related to determining cross connection according to various embodiments of the disclosure. For example, the charging function control signal may include identification information and configuration information for determining cross connection, and may include pattern or time information related to a load change of the wireless power reception device 101 for cross connection determination.

According to various embodiments, the processor 120 may control the display 160 to display the condition of the wireless power reception device 101. The processor 120 may also display, on the display 160, the estimated time for the wireless power reception device 101 to complete charging.

Figure 5:
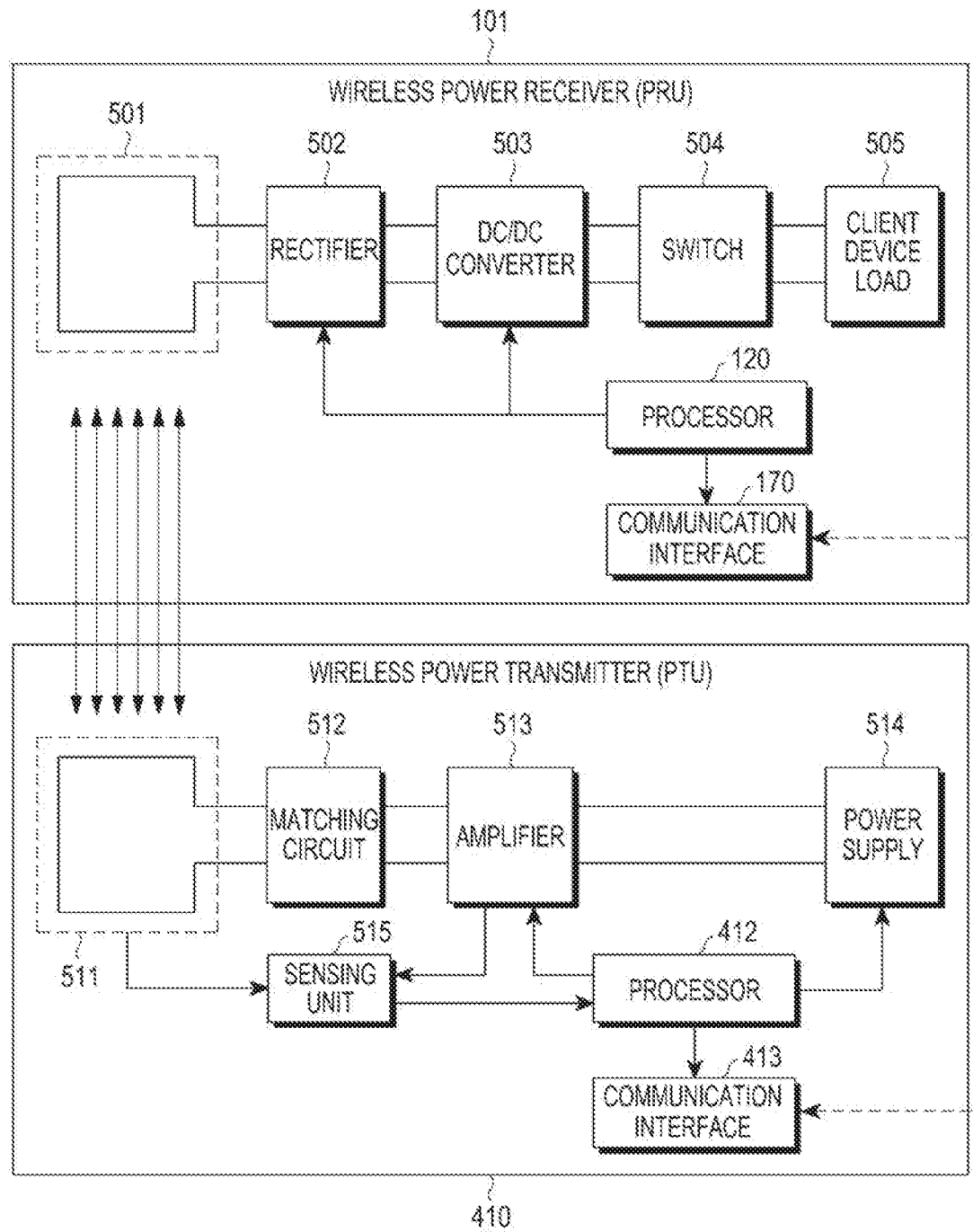
FIG. 5 is a detailed block diagram illustrating a wireless power transmitter and a wireless power receiver according to various embodiments of the disclosure.

FIG. 5 is a detailed block diagram illustrating a wireless power transmitter and a wireless power receiver according to various embodiments of the disclosure.

As illustrated in FIG. 5, the wireless power transmitter 200 may include at least one of a transmission (Tx) resonator 511, a processor 412, a communication interface 413, a power supply 514, an amplifier (power amp) 513, a matching circuit 512, and a sensing unit 515. The wireless power receiver 101 may include at least one of a reception (Rx) resonator 501, a processor 120, a communication interface 170, a rectifier 502, a DC/DC converter 503, a switch 504, and a client device load 505.

The power supply 514 may output DC power having a preset voltage value. The voltage value of the DC power output from the power supply 514 may be controlled by the processor 412. The DC current outputted from the power supply 514 may be outputted to the amplifier 513.

The amplifier 513 may amplify the DC current to a preset gain. In addition, the amplifier 513 may convert the DC power into AC current on the basis of a signal input from the processor 412. Accordingly, the amplifier 513 may output AC power.

The matching circuit 512 may perform impedance matching. For example, the matching circuit 512 may control the output power to be high-efficiency or high-output by adjusting impedance as viewed from the matching circuit 512. The sensing unit 515 may sense a load change by the wireless power receiver 101 through the Tx resonator 511 or the amplifier 513. The sensing result from the sensing unit 515 may be provided to the processor 412.

The matching circuit 512 may adjust the impedance on the basis of the control of the processor 412. The matching circuit 512 may include at least one of a coil and a capacitor. The processor 412 may control the state of connection with at least one of the coil and the capacitor, thereby performing impedance matching.

The Tx resonator 511 may transmit the inputted AC power to the Rx resonator 501. The Tx resonator 511 and the Rx resonator 501 may be configured as resonant circuits having the same frequency. For example, the resonant frequency may be determined to be 110 to 205 kHz. In one embodiment, an inverter (not shown) may invert the DC power from the power supply 514 into AC power and may transmit the AC power to the Tx resonator 511.

The communication interface 413 may perform communication with the communication interface 170 of the wireless power receiver 101.

The Rx resonator 501 may receive power for charging from the wireless power transmitter 410.

The rectifier 502 may rectify the wireless power received by the Rx resonator 501 into a DC form and may be configured, for example, in the form of a bridge diode. The DC/DC converter 503 may convert the rectified power into a preset gain. For example, the DC/DC converter 503 may convert the rectified power so that the voltage of an output terminal is 5V. The minimum value and the maximum value of the voltage that can be applied to a front terminal of the DC/DC converter 503 may be set in advance.

The switch 504 may connect the DC/DC converter 503 and the client device load 505. The switch 504 may maintain an on/off state under the control of the processor 120. The switch 504 may be omitted. The client device load 505 may store the converted power input from the DC/DC converter 503 when the switch 504 is in the on state.

The processor 120 may measure the charging frequency and the voltage of a transmission coil included in a power transmission unit 411 of the wireless power transmitter 410 and power received from the wireless power transmitter 410 and may transmit the measurement results to the communication interface 413 of the wireless power transmitter 410 via the communication network 170. The communication interface 170 may perform communication with the wireless power transmitter 410 in a predetermined mode. The communication interface 170 may transmit power information to the wireless power transmitter 410 when a power beacon is received from the wireless power transmitter 410. Here, the power information may include at least one of output voltage information and charging current information of the wireless power receiver 101. Alternatively, the power information may include information about the insertion of a wired charging terminal, a switch from the Stand-Alone (SA) mode to the Non-Stand-Alone (NSA) mode, release from an error condition, a control signal for power control, the charging frequency, the voltage, and the measured value of transmitted power of the transmission coil included in the power transmission unit 411. The processor 120 may measure a temperature recorded during wireless power reception via a thermistor included in the temperature/humidity sensor 240J and may determine the state in which the wireless power receiver 101 is arranged relative to the wireless power transmitter 410. For example, when the measured temperature is less than a predetermined threshold value, the processor 120 may determine that the wireless power receiver 101 is aligned with the wireless power transmitter 410. Alternatively, when the measured temperature is greater than the predetermined threshold value, the processor 120 may measure at least one of the frequency, the voltage, and the transmitted power of the transmission coil of the wireless power transmitter 410 and may determine whether the wireless power receiver 101 is aligned or misaligned with the wireless power transmitter 410. The processor 120 may transmit information based on the determination result to the wireless power transmitter 410.

According to various embodiments of the disclosure, a wireless power reception device may include: a power reception unit, configured to wirelessly receive power from a wireless power transmission device; a power source unit, configured to be charged with the received power; and a processor, wherein the processor may be configured to: measure a temperature resulting from the received power, measure at least one of a frequency, voltage, and transmitted power of a transmission coil of the wireless power transmission device when the measured temperature is greater than a first threshold value, identify whether an arrangement relative to the wireless power transmission device is an aligned state or a misaligned state by comparing the measured value with a preset value, transmit a first control signal for controlling the power received from the wireless power transmission device to the wireless power transmission device when the arrangement is the misaligned state, and receive power controlled based on the transmitted first control signal.

According to one embodiment, the processor may be configured to: operate a timer when the measured temperature is greater than the first threshold value, measure a temperature resulting from the power received based on the transmitted first control signal, and transmit a second control signal for additionally controlling the power to the wireless power transmission device when the temperature, measured after a predetermined time, is greater than a second threshold value.

According to one embodiment, the disclosure may further include an input/output interface, wherein the processor may be configured to output information about misalignment to a user through the input/output interface when it is identified that the arrangement relative to the wireless power transmission device is the misaligned state.

According to one embodiment, the processor may be configured to transmit the first control signal to the wireless power transmission device within the predetermined time.

According to one embodiment, the processor may be configured to measure the temperature resulting from the power continuously received based on the first control signal when the temperature, measured after the predetermined time, is not greater than the second threshold value.

According to one embodiment, the first threshold value (e.g., 43 degrees) may be greater than the second threshold value (e.g., 38 degrees).

According to one embodiment, the processor may be configured to transmit the first control signal or the second control signal to the wireless power transmission device by comparing the measured value with the preset value (e.g., charging frequency: 110 kHz to 205 kHz, voltage: Vrect of 8.9 V or less, transmitted power: 13 W or greater).

According to one embodiment, the processor may be configured to transmit the first control signal for controlling the power received from the wireless power transmission device to the wireless power transmission device when the measured value is not greater than the preset value.

According to one embodiment, the processor may be configured to transmit the second control signal for controlling the power received from the wireless power transmission device to the wireless power transmission device when the measured value is greater than the preset value.

According to one embodiment, the preset value may vary according to the measured charging frequency, voltage, and power.

According to one embodiment, when it is identified that the arrangement relative to the wireless power transmission device is the misaligned state, the charging frequency and the voltage of the transmission coil may be reduced, and the power transmitted from the wireless power transmission device may be increased.

Figure 6:
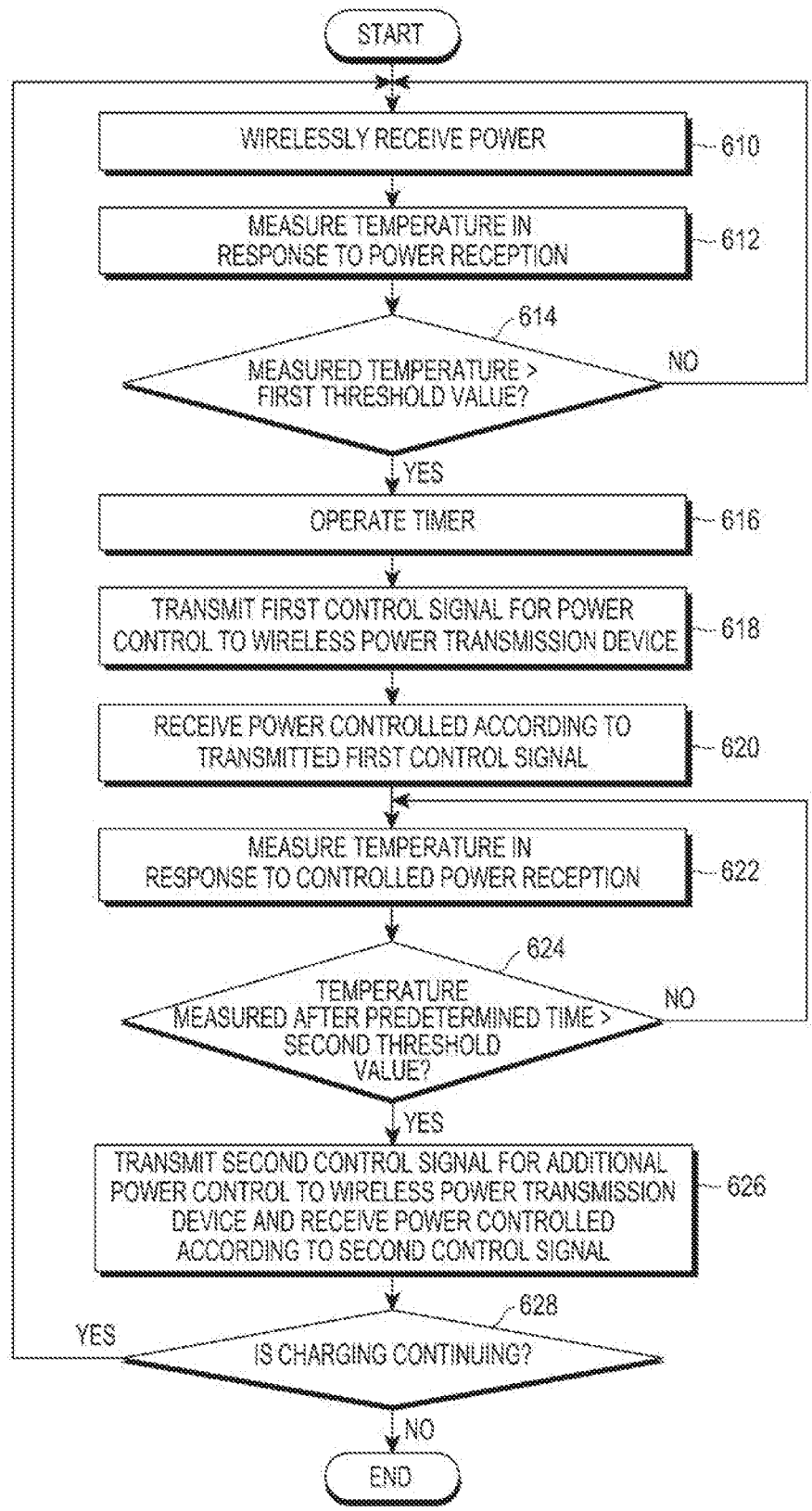
FIG. 6 is a flowchart illustrating a wireless charging control method of a wireless power reception device according to an embodiment of the disclosure.

FIG. 6 is a flowchart illustrating a wireless charging control method of a wireless power reception device according to an embodiment of the disclosure.

Hereinafter, the wireless charging control method of the wireless power reception device according to the embodiment of the disclosure will be described in detail with reference to FIG. 6.

In operation 610, the wireless power reception device 101 (e.g., the processor 120) may wirelessly receive power from the wireless power transmission device 410. The wireless power reception device 101 (e.g., the processor 120) may receive the power wirelessly received through the Tx resonator 511 of the wireless power transmission device 410 through the Rx resonator 501.

In operation 612, the wireless power reception device 101 (e.g., the processor 120) may measure a temperature in response to the power reception. The wireless power reception device 101 (e.g., the processor 120) may measure an increasing heat-generating temperature that increases in response to the power reception per predetermined time (or in real time). The wireless power reception device 101 (e.g., the processor 120) may measure the heat-generating temperature, which increases in response to the power reception through a temperature measurement sensor (e.g., a thermistor).

In operation 614, the wireless power reception device 101 (e.g., the processor 120) may compare the measured temperature with a first threshold value. The wireless power reception device 101 (e.g., the processor 120) may compare the measured temperature with the first threshold value for a predetermined time (or in real time) to determine whether the measured temperature reaches the first threshold value (e.g., 43 degrees). When the measured temperature is lower than the first threshold value, the wireless power reception device 101 (e.g., the processor 120) may receive power having the same level as the level of the power received in operation 614.

In operation 616, the wireless power reception device 101 (e.g., the processor 120) may operate a timer. When the measured temperature is greater than the first threshold value, the wireless power reception device 101 (e.g., the processor 120) may operate the timer.

In operation 618, the wireless power reception device 101 (e.g., the processor 120) may transmit a first control signal for wireless charging control to the wireless power transmission device 410. The wireless power reception device 101 (e.g., the processor 120) may transmit the first control signal for reducing the strength of the transmitted power to the communication interface 413 of the wireless power transmission device 410 via the communication interface 170. For example, when the power received in operation 610 has a voltage of 9 V and a current of 1 A, the wireless power reception device 101 (e.g., the processor 120) may transmit a first control signal for controlling the current to 0.6 A to the wireless power transmission device 410.

In operation 620, the wireless power reception device 101 (e.g., the processor 120) may receive power controlled according to the transmitted first control signal. The wireless power reception device 101 (e.g., the processor 120) may receive the controlled power having a voltage of 9 V and a current of 0.6 A according to the transmitted first control signal.

In operation 622, the wireless power reception device 101 (e.g., the processor 120) may measure a temperature in response to reception of the controlled power. The wireless power reception device 101 (e.g., the processor 120) may measure a heat-generating temperature in response to reception of the power controlled according to the transmitted first control signal.

In operation 624, the wireless power reception device 101 (e.g., the processor 120) may compare a temperature measured after a predetermined time with a second threshold value. The wireless power reception device 101 (e.g., the processor 120) may determine whether the predetermined time (e.g., five minutes) has elapsed using the timer operated in operation 616. The wireless power reception device 101 (e.g., the processor 120) may transmit the first control signal to the wireless power transmission device 410 within the predetermined time. The wireless power reception device 101 (e.g., the processor 120) may compare the temperature measured after the predetermined time with the second threshold value. The first threshold value may be greater than the second threshold value.

In operation 626, the wireless power reception device 101 (e.g., the processor 120) may transmit a second control signal for additional wireless charging control to the wireless power transmission device 410 and may receive power controlled according to the second control signal. For example, when the power received in operation 620 has a voltage of 9 V and a current of 0.6 A, the wireless power reception device 101 (e.g., the processor 120) may transmit a second control signal for controlling the voltage to 5V and the current to 0.4 A to the wireless power transmission device 410. The wireless power reception device 101 (e.g., the processor 120) may receive the controlled power having a voltage of 5 V and a current of 0.4 A according to the transmitted second control signal.

In operation 628, the wireless power reception device 101 (e.g., the processor 120) may determine whether charging is continuing. The wireless power reception device 101 (e.g., the processor 120) may determine whether charging has been completed or whether a connection for wirelessly receiving power from the wireless power transmission device 410 is maintained. When a temperature resulting from the power received on the basis of a second control signal reaches a third threshold value (e.g., 38 degrees), the wireless power reception device 101 (e.g., the processor 120) may transmit a signal requesting the supply of power at the voltage and current levels of the power received in operation 610 to the wireless power transmission device 410. Operations 610 to 626 may be performed at least one time until charging is completed.

According to various embodiments of the disclosure, a method for controlling wireless charging of a wireless power reception device may include: wirelessly receiving power from a wireless power transmission device; measuring a temperature resulting from the received power; measuring at least one of a frequency, voltage, and transmitted power of a transmission coil of the wireless power transmission device when the measured temperature is greater than a first threshold value; identifying whether an arrangement relative to the wireless power transmission device is an aligned state or a misaligned state by comparing the measured value with a preset value; transmitting a first control signal for controlling the power, received from the wireless power transmission device, to the wireless power transmission device when the arrangement is the misaligned state; and receiving power controlled based on the transmitted first control signal.

According to one embodiment, the disclosure may further include: operating a timer when the measured temperature is greater than the first threshold value; measuring a temperature resulting from the power received based on the transmitted first control signal; and transmitting a second control signal for additionally controlling the power to the wireless power transmission device when the measured temperature after a predetermined time is greater than a second threshold value.

According to one embodiment, the disclosure may further include outputting information about misalignment to a user when it is identified that the arrangement relative to the wireless power transmission device is the misaligned state.

According to one embodiment, the disclosure may further include transmitting the first control signal to the wireless power transmission device within the predetermined time.

According to one embodiment, the disclosure may further include measuring the temperature resulting from the power continuously received based on the first control signal when the temperature, measured after the predetermined time, is not greater than the second threshold value.

Figure 7:
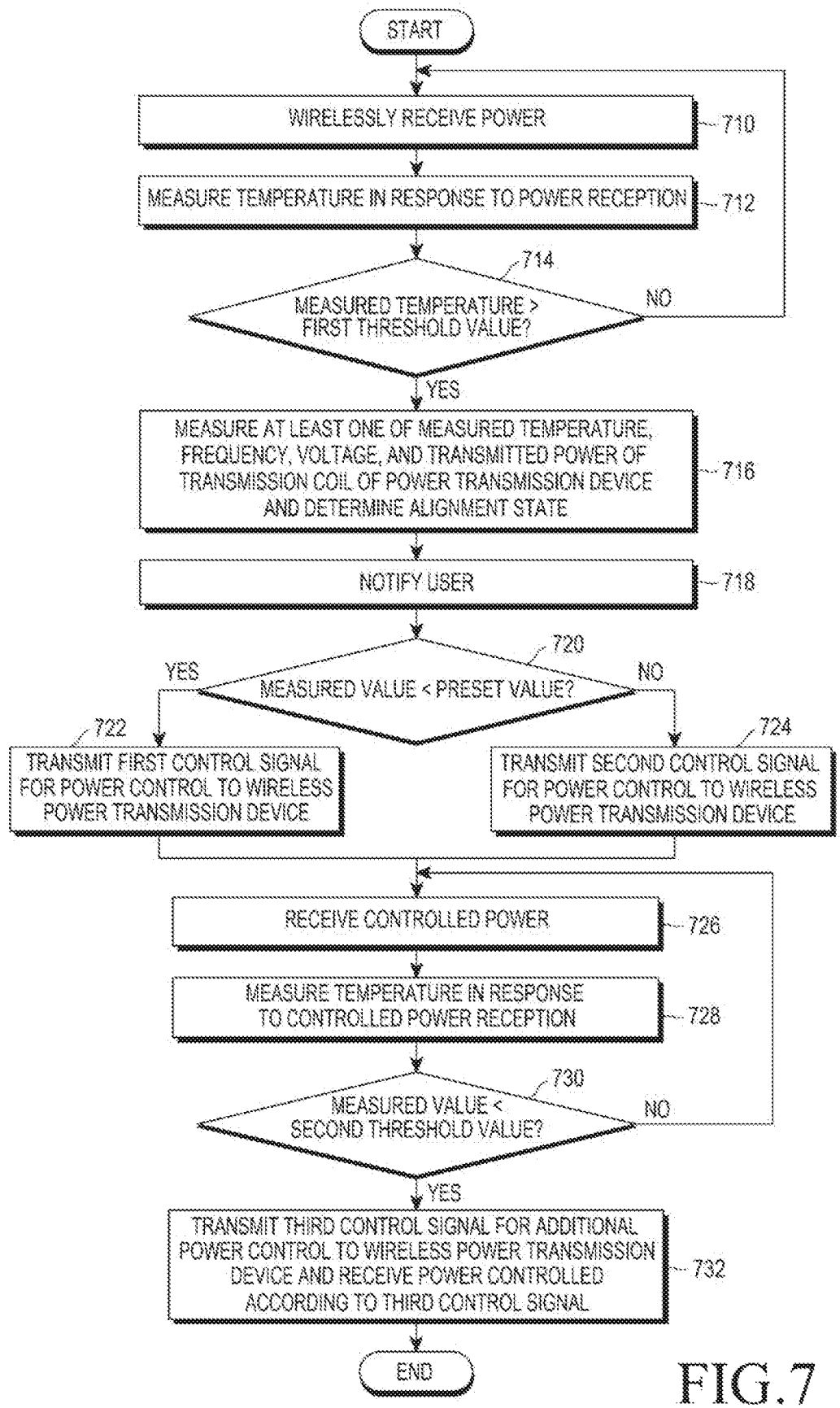
FIG. 7 is a flowchart illustrating a wireless charging control method of a wireless power reception device according to another embodiment of the disclosure.

FIG. 7 is a flowchart illustrating a wireless charging control method of a wireless power reception device according to another embodiment of the disclosure.

Hereinafter, the wireless charging control method of the wireless power reception device according to the other embodiment of the disclosure will be described in detail with reference to FIG. 7.

In operation 710, the wireless power reception device 101 (e.g., the processor 120) may wirelessly receive power from the wireless power transmission device 410. The wireless power reception device 101 (e.g., the processor 120) may receive the power wirelessly received through the Tx resonator 511 of the wireless power transmission device 410 through the Rx resonator 501.

In operation 712, the wireless power reception device 101 (e.g., the processor 120) may measure a temperature in response to the power reception. The wireless power reception device 101 (e.g., the processor 120) may measure an increasing heat-generating temperature, which increases in response to the power reception per predetermined time (or in real time). The wireless power reception device 101 (e.g., the processor 120) may measure the heat-generating temperature, which increases in response to the power reception through a temperature measurement sensor (e.g., a thermistor).

In operation 714, the wireless power reception device 101 (e.g., the processor 120) may compare the measured temperature with a first threshold value. The wireless power reception device 101 (e.g., the processor 120) may compare the measured temperature with the first threshold value for a predetermined time (or in real time) to determine whether the measured temperature reaches the first threshold value (e.g., 43 degrees). The wireless power reception device 101 (e.g., the processor 120) may determine whether the measured temperature reaches the first threshold value (e.g., 43 degrees). When the measured temperature is lower than the first threshold value, the wireless power reception device 101 (e.g., the processor 120) may receive power having the same level as the level of the power received in operation 614.

In operation 716, the wireless power reception device 101 (e.g., the processor 120) may measure at least one of the measured temperature, the frequency, the voltage, and the transmitted power of a transmission coil of the power transmission device 410 and may determine whether the wireless power reception device 101 is aligned. When the measured temperature is higher than the first threshold value, the wireless power reception device 101 (e.g., the processor 120) may measure at least one of the frequency, the voltage, and the transmitted power of the transmission coil of the wireless power transmission device 410. When the measured temperature is higher than the first threshold value, the wireless power reception device 101 (e.g., the processor 120) may measure the charging frequency and the voltage of the transmission coil included in the power transmission unit 411 of the wireless power transmission device 410 and the power received from the wireless power transmission device 410 while receiving the power. When the measured temperature is higher than the first threshold value, the wireless power reception device 101 (e.g., the processor 120) may compare the measured frequency, voltage, and transmitted power with respective threshold values and may determine whether the wireless power transmission device 410 and the wireless power reception device 101 are aligned or misaligned.

In operation 718, when it is determined that the wireless power transmission device 410 and the wireless power reception device 101 are misaligned on the basis of at least one of the measured temperature, frequency, voltage, and transmitted power, the electronic device 101 (e.g., the processor 120) may notify a user of the misalignment. When it is determined that the wireless power reception device 101 is misaligned with the wireless power transmission device 410, the wireless power reception device 101 (e.g., the processor 120) may output a notification (e.g., vibrations, a sound, or a popup message) indicating the misalignment to the user.

In operation 720, the wireless power reception device 101 (e.g., the processor 120) may compare the measured value with a preset value. The wireless power reception device 101 (e.g., the processor 120) may compare the measured charging frequency, voltage, and received power with respective preset values. The preset values may be set to different values corresponding to the measured charging frequency, voltage, and received power. The wireless power reception device 101 (e.g., the processor 120) may determine whether the measured charging frequency is less than a predetermined range (e.g., 110 to 205 kHz). The wireless power reception device 101 (e.g., the processor 120) may determine whether the measured voltage is less than a predetermined value (e.g., 8.9 V). The wireless power reception device 101 (e.g., the processor 120) may determine whether the measured power is greater than a predetermined value (e.g., 13 W).

In operation 722, when the measured value is not greater than the preset value, the wireless power reception device 101 (e.g., the processor 120) may transmit a first control signal for power control to the wireless power transmission device 410. The first control signal may include information requesting transmission of power with a voltage of 9 V and a current of 0.6 A.

In operation 724, when the measured value is greater than the preset value, the wireless power reception device 101 (e.g., the processor 120) may transmit a second control signal for power control to the wireless power transmission device 410. The second control signal may include information requesting transmission of power with a voltage of 5 V and a current of 0.4 A.

In operation 726, the wireless power reception device 101 (e.g., the processor 120) may receive power controlled by the control signal transmitted in operation 722 or 724. The wireless power reception device 101 (e.g., the processor 120) may receive the power transmitted according to the transmitted second control signal through the Rx resonator 501.

In operation 728, the wireless power reception device 101 (e.g., the processor 120) may measure a temperature in response to the reception of the controlled power in operation 726. The wireless power reception device 101 (e.g., the processor 120) may receive the power controlled by the transmitted first control signal or second control signal and may charge the received power in the power source unit 422. The wireless power reception device 101 (e.g., the processor 120) may measure a heat-generating temperature in response to the reception of the power controlled by the transmitted first control signal or second control signal.

In operation 730, the wireless power reception device 101 (e.g., the processor 120) may compare the measured temperature with a second threshold value. The wireless power reception device 101 (e.g., the processor 120) may compare the measured temperature in response to the reception of the power controlled by the transmitted first control signal or second control signal with the second threshold value (e.g., 38 degrees).

When the measured temperature is greater than the second threshold value in operation 730, the wireless power reception device 101 (e.g., the processor 120) may transmit a third control signal for additionally controlling the power to the wireless power transmission device 410 and may receive a signal controlled according to the third control signal from the wireless power transmission device 410 in operation 732. The wireless power reception device 101 (e.g., the processor 120) may determine whether charging is continuing. The wireless power reception device 101 (e.g., the processor 120) may determine whether charging has been completed or whether a connection for wirelessly receiving power from the wireless power transmission device 410 is maintained. When a temperature resulting from the power received on the basis of third control signal reaches a third threshold value (e.g., 38 degrees), the wireless power reception device 101 (e.g., the processor 120) may transmit a signal requesting the supply of power at the voltage and current levels of the power received in operation 710 to the wireless power transmission device 410. Operations 710 to 732 may be performed at least one time until charging is completed.

According to various embodiments of the disclosure, a wireless charging control method of a wireless power reception device may include: wirelessly receiving power from a wireless power transmission device; measuring a temperature resulting from the received power; measuring at least one of the frequency, voltage, and transmitted power of a transmission coil of the wireless power transmission device when the measured temperature is greater than a first threshold value; determining whether an arrangement relative to the wireless power transmission device is an aligned state or a misaligned state by comparing the measured value with a preset value; transmitting a first control signal for controlling the power received from the wireless power transmission device to the wireless power transmission device when the arrangement is the misaligned state; and receiving power controlled according to the transmitted first control signal.

According to one embodiment, the disclosure may further include transmitting the first control signal or the second control signal to the wireless power transmission device by comparing the measured value with the preset value.

According to one embodiment, the disclosure may further include transmitting the first control signal for controlling the power received from the wireless power transmission device to the wireless power transmission device when the measured value is not greater than the preset value.

According to one embodiment, the disclosure may further include transmitting the second control signal for controlling the power received from the wireless power transmission device to the wireless power transmission device when the measured value is greater than the preset value.

(a) of FIG. 8 illustrates that a wireless power reception device is aligned on a wireless power transmission device according to various embodiments of the disclosure, and (b) of FIG. 8 illustrates that a wireless power reception device is misaligned on a wireless power transmission device according to various embodiments of the disclosure.

Figures 8A, 8B:
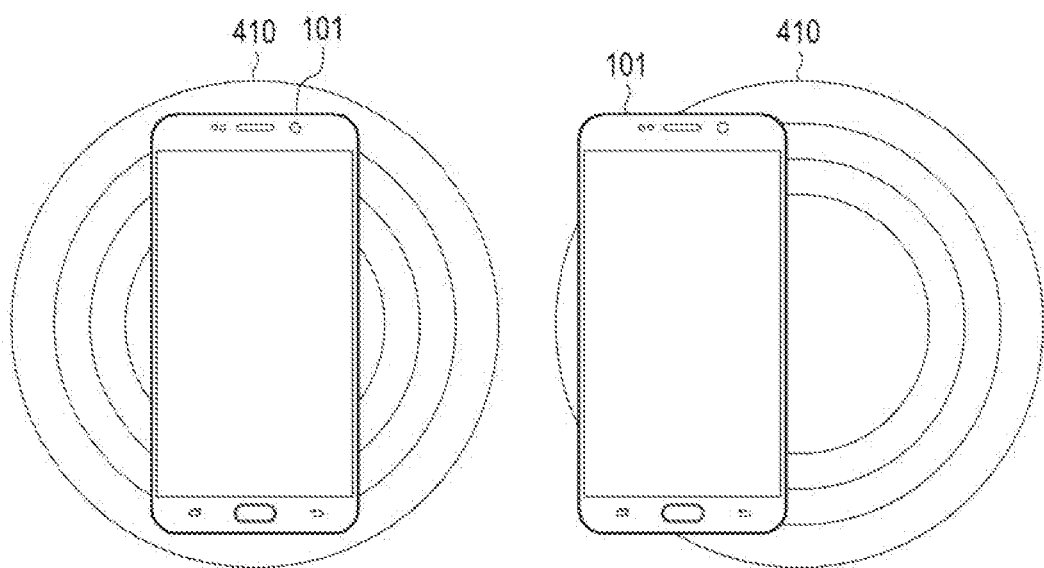

Referring to (a) of FIG. 8, the wireless power transmission device 410 according to various embodiments of the disclosure may include an induction coil (or a resonance coil). For example, the wireless power transmission device 410 may include an induction coil for wirelessly supplying power to an electronic device that is charged by a magnetic induction method or a resonance coil for wirelessly supplying power to an electronic device that is charged by a magnetic resonance method. The induction coil and the resonance coil may be provided at various positions in order to increase the efficiency of power supply. The wireless power reception device 101 may be a device that can be charged by the magnetic induction method and/or the magnetic resonance method, and may include an induction coil and/or a resonance coil. For example, as shown in (a) of FIG. 8, when the wireless power reception device 101 is aligned on the wireless power transmission device 410 (e.g., the induction coil included in the wireless power reception device 101 is aligned with the induction coil included in the wireless power transmission device 410), the wireless power reception device 101 can be charged with high charging efficiency (e.g., 90% compared to wired charging). As shown in (b) of FIG. 8B, when the wireless power reception device 101 is misaligned on the wireless power transmission device 410 (e.g., the induction coil included in the wireless power reception device 101 is misaligned with the induction coil included in the wireless power transmission device 410), the wireless power reception device 101 can be charged with low charging efficiency (e.g., 90% or less compared to wired charging).

FIG. 9A illustrates a temperature that is measured when a wireless power reception device is aligned on a wireless power transmission device according to an embodiment of the disclosure, and FIG. 9B illustrates a temperature that is measured when the wireless power reception device is misaligned on the wireless power transmission device according to an embodiment of the disclosure.

Referring to FIGS. 9A and 9B, when the wireless power reception device 101 is aligned on the wireless power transmission device 410, the wireless power reception device 101 may not be controlled at a certain time interval due to the heat generated in the wireless power reception device 101. As shown in FIG. 9A, the wireless power reception device 101 is triggered at a temperature of 43 degrees, measured by a thermistor, and is released at 42.9 degrees. As shown in FIG. 9B, when the wireless power reception device 101 is misaligned on the wireless power transmission device 410, the heat-generating temperature is higher than that in an aligned state (FIG. 9A). In this case, the charging current in a misaligned state is lower than that in the aligned state.

FIG. 10 illustrates the relationship between a heat-generating temperature 1010 and charging current 1020 in the state in which a wireless power reception device is misaligned on a wireless power transmission device according to an embodiment of the disclosure.

As shown in FIG. 10, when the wireless power reception device is misaligned on the wireless power transmission device, the heat-generating temperature is higher than that in an aligned state and a charging current is lower than that in the aligned state. Thus, when the wireless power reception device is misaligned on the wireless power transmission device, power transmission efficiency is lower than that in the aligned state.

FIG. 11 illustrates a temperature change due to wireless charging by operating a timer according to an embodiment of the disclosure.

Referring to FIG. 11, the disclosure may: measure a temperature resulting from power received from the wireless power transmission device 410; measure at least one of the frequency, voltage, and transmitted power of the transmission coil of the wireless power transmission device 410 to determine whether the state of arrangement relative to the wireless power transmission device 410 is an aligned state or a misaligned state when the measured temperature is higher than a threshold value; transmit a control signal for controlling the power received from the wireless power transmission device 410 to the wireless power transmission device 410; and receive and charge power controlled according to the transmitted control signal. Alternatively, the disclosure may measure at least one of the charging frequency, voltage, and received power of the transmission coil of the wireless power transmission device 410 and may compare the measured value with a preset value, thereby determining whether the state of arrangement relative to the wireless power transmission device 410 is the aligned state or the misaligned state. Then, the wireless power reception device 101 may transmit a first control signal or a second control signal to the wireless power transmission device 410 and may receive and charge power controlled according to the transmitted first control signal or second control signal. According to this charging method, the disclosure may control a heat-generating temperature and may improve wireless charging efficiency.

The term "module" as used herein may, for example, mean a unit including one of hardware, software, and firmware or a combination of two or more of them. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the disclosure may be implemented by a command stored in a computer-readable storage medium in a programming module form. When the command is executed by control circuits, the control circuits may perform a function corresponding to the command. The computer-readable storage medium may, for example, be the memory 130. At least some of the programming modules may be implemented (for example, executed) by, for example, the processor. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact Disc Read Only Memory (CD-ROM) and a Digital Versatile Disc (DVD), magneto-optical media such as a floptical disk, and hardware devices specifically configured to store and execute program commands, such as a Read Only Memory (ROM), a Random Access Memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added. According to various embodiments, a storage medium may store commands, wherein the commands may be configured for at least one processor to perform at least one operation when executed by the at least one processor, the commands including: a first command set to wirelessly receive power from a wireless power transmission device; a second command set to measure a temperature resulting from the received power; a third command set to measure at least one of the frequency, voltage, and transmitted power of a transmission coil of the wireless power transmission device when the measured temperature is higher than a first threshold value; a fourth command set to determine whether an arrangement relative to the wireless power transmission device is an aligned state or a misaligned state by comparing the measured value with a preset value; a fifth command set to transmit a first control signal for controlling the power received from the wireless power transmission device to the wireless power transmission device when the arrangement is the misaligned state; and a sixth command set to receive power controlled according to the transmitted first control signal.

Exemplary embodiments of the disclosure shown and described in this specification and the drawings correspond to specific examples presented in order to easily describe technical contents of the disclosure and to help comprehension of the disclosure, and are not intended to limit the scope of the disclosure. Therefore, it should be construed that, in addition to the embodiments disclosed herein, all modifications and changes or modified and changed forms derived from the technical idea of the disclosure fall within the scope of the disclosure.

The invention claimed is:

1. A wireless power reception device comprising:
a power reception unit configured to wirelessly receive power from a wireless power transmission device;
a power source unit configured to be charged with the received power; and
a processor,
wherein the processor is configured to:
measure a first temperature resulting from the received power,
measure at least one of a frequency, voltage, and transmitted power of a transmission coil of the wireless power transmission device when the measured first temperature is greater than a first threshold value,
identify whether an arrangement relative to the wireless power transmission device is an aligned state or a misaligned state by comparing a measured value with a preset value,
in response to identifying that the arrangement is the misaligned state, transmit a first control signal for controlling the power received from the wireless power transmission device to the wireless power transmission device, and
receive power controlled based on the transmitted first control signal.

2. The wireless power reception device of claim 1, wherein the processor is configured to:
operate a timer when the measured first temperature is greater than the first threshold value, measure a second temperature resulting from the power received based on the transmitted first control signal, and transmit a second control signal for additionally controlling the power to the wireless power transmission device when the second temperature, measured after a predetermined time, is greater than a second threshold value.

3. The wireless power reception device of claim 1, further comprising:

an input/output interface, wherein the processor is configured to output information about the misaligned state to a user through the input/output interface when it is identified that the arrangement relative to the wireless power transmission device is the misaligned state.

4. The wireless power reception device of claim 2, wherein the processor is configured to transmit the first control signal to the wireless power transmission device within the predetermined time.

5. The wireless power reception device of claim 2, wherein the processor is configured to measure a third temperature resulting from the power continuously received based on the first control signal when the second temperature, measured after the predetermined time, is not greater than the second threshold value.

6. The wireless power reception device of claim 2, wherein the first threshold value is greater than the second threshold value.

7. The wireless power reception device of claim 1, wherein the processor is configured to transmit the first control signal or a second control signal to the wireless power transmission device by comparing the measured value with the preset value.

8. The wireless power reception device of claim 1, wherein the processor is configured to transmit the first control signal for controlling the power received from the wireless power transmission device to the wireless power transmission device when the measured value is not greater than the preset value.

9. The wireless power reception device of claim 1, wherein the processor is configured to transmit a second control signal for controlling the power received from the wireless power transmission device to the wireless power transmission device when the measured value is greater than the preset value.

10. The wireless power reception device of claim 1, wherein the preset value varies according to the measured frequency, voltage, and/or transmitted power.

11. The wireless power reception device of claim 1, wherein, when it is identified that the arrangement relative to the wireless power transmission device is the misaligned state, the frequency and the voltage of the transmission coil are reduced and the power transmitted from the wireless power transmission device is increased.

12. A method for controlling wireless charging of a wireless power reception device, the method comprising:

wirelessly receiving power from a wireless power transmission device;

measuring a first temperature resulting from the received power;

measuring at least one of a frequency, voltage, and transmitted power of a transmission coil of the wireless power transmission device when the measured first temperature is greater than a first threshold value;

identifying whether an arrangement relative to the wireless power transmission device is an aligned state or a misaligned state by comparing a measured value with a preset value;

in response to identifying that the arrangement is the misaligned state, transmitting a first control signal for controlling the power received from the wireless power transmission device to the wireless power transmission device; and receiving power controlled based on the transmitted first control signal.

13. The method of claim 12, further comprising:

operating a timer when the measured first temperature is greater than the first threshold value;

measuring a second temperature resulting from the power received based on the transmitted first control signal; and transmitting a second control signal for additionally controlling the power to the wireless power transmission device when the second temperature, measured after a predetermined time, is greater than a second threshold value.

14. The method of claim 12, further comprising:

outputting information about the misaligned state to a user when it is identified that the arrangement relative to the wireless power transmission device is the misaligned state.

15. A computer-readable storage medium that stores a program comprising instructions to control power in a wireless power reception device comprising a power reception unit, a power source unit, and a processor, wherein the instructions are configured to, when executed, cause the processor to:

wirelessly receive power from a wireless power transmission device;

measure a temperature resulting from the received power;

measure at least one of a frequency, voltage, and transmitted power of a transmission coil of the wireless power transmission device when the measured temperature is greater than a first threshold value;

identify whether an arrangement relative to the wireless power transmission device is an aligned state or a misaligned state by comparing a measured value with a preset value;

in response to identifying that the arrangement is the misaligned state, transmit a first control signal for controlling the power received from the wireless power transmission device to the wireless power transmission device; and receive power controlled based on the transmitted first control signal.

* * * * *